Nov. 7, 1950 W. H. SALE 2,529,352
BRAKE BEAM SUSPENSION
Filed April 19, 1946 5 Sheets-Sheet 1
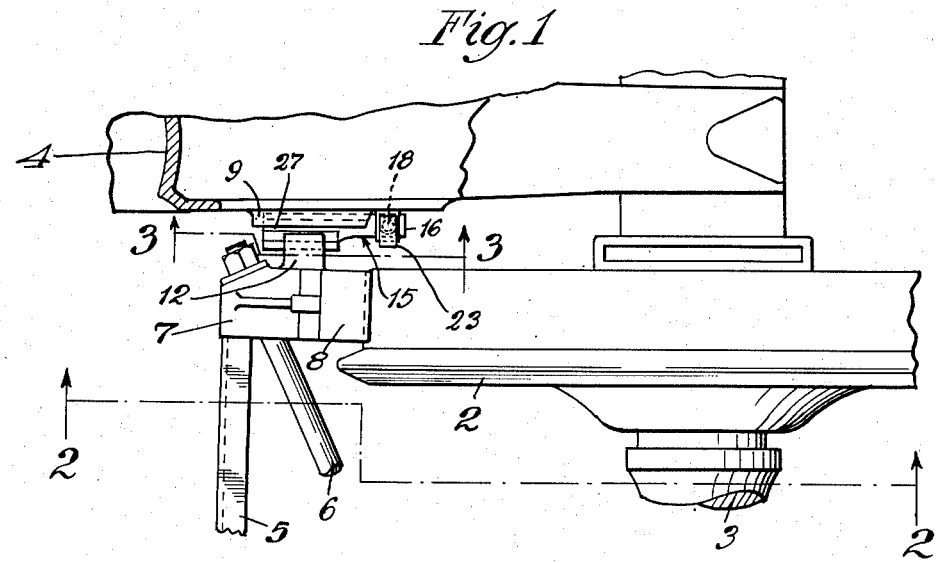
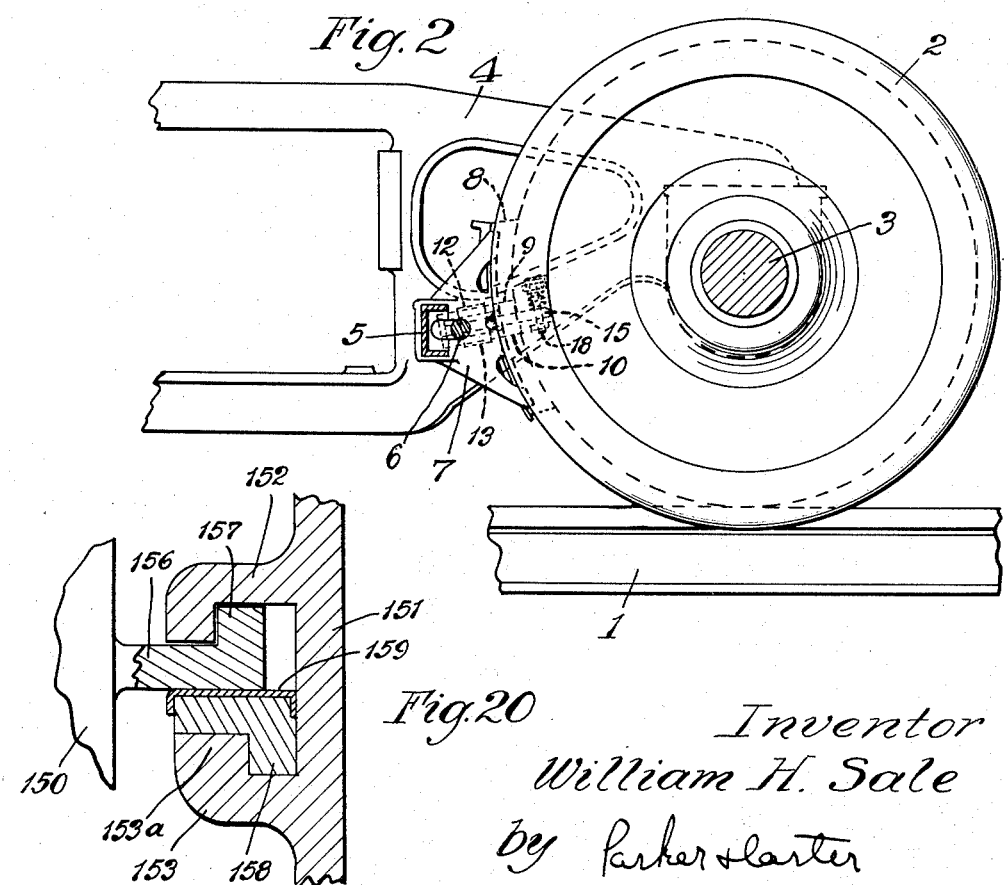
Inventor
William H. Sale
by Parker & Carter
Attorneys Nov. 7, 1950     W. H. SALE     2,529,352
BRAKE BEAM SUSPENSION
Filed April 19, 1946     5 Sheets-Sheet 2
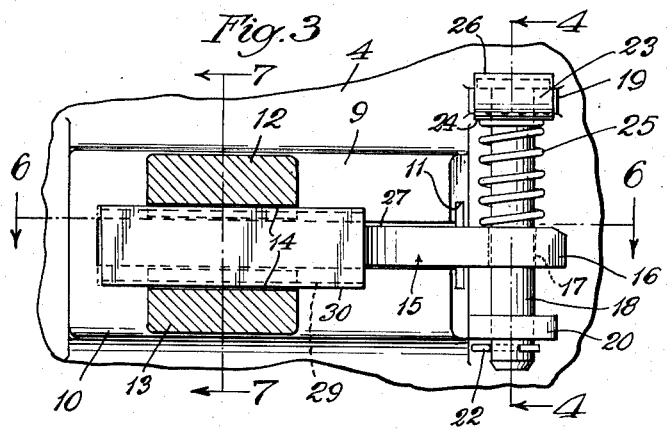
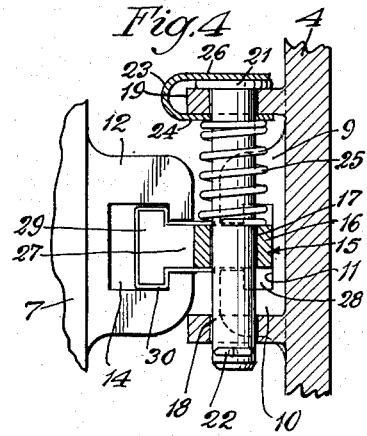
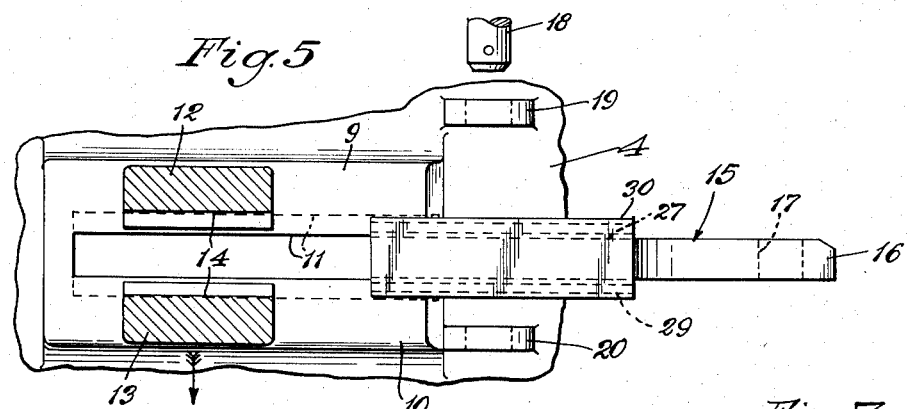
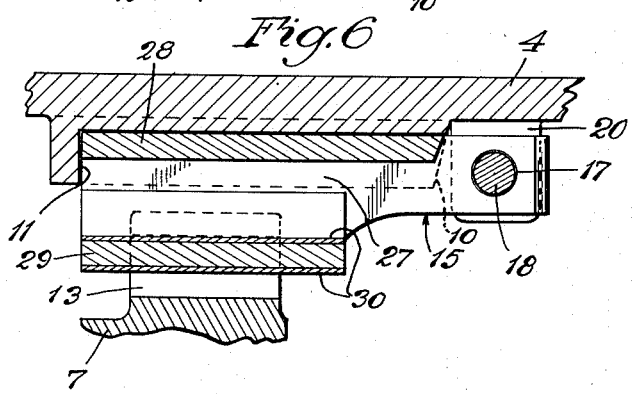
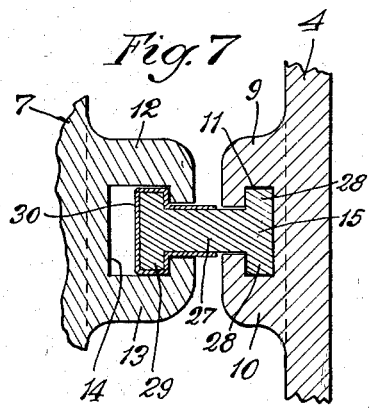
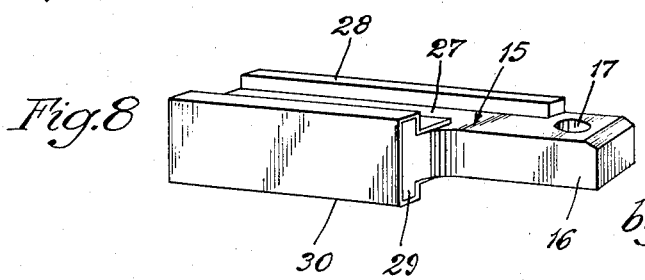
Inventor
William H. Sale
by Parker & Carter
Attorneys Nov. 7, 1950
W. H. SALE
2,529,352
BRAKE BEAM SUSPENSION
Filed April 19, 1946
5 Sheets-Sheet 3
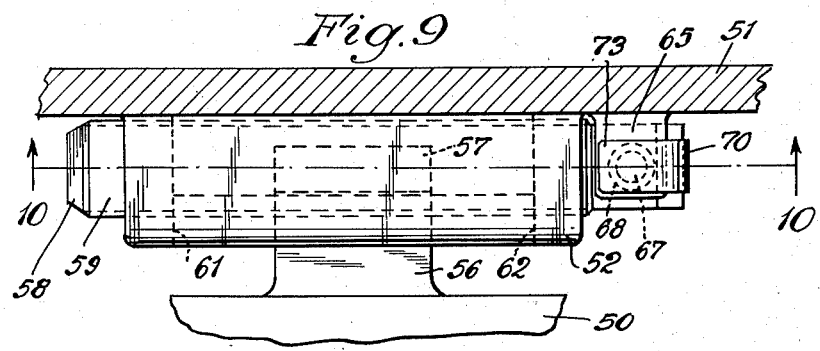
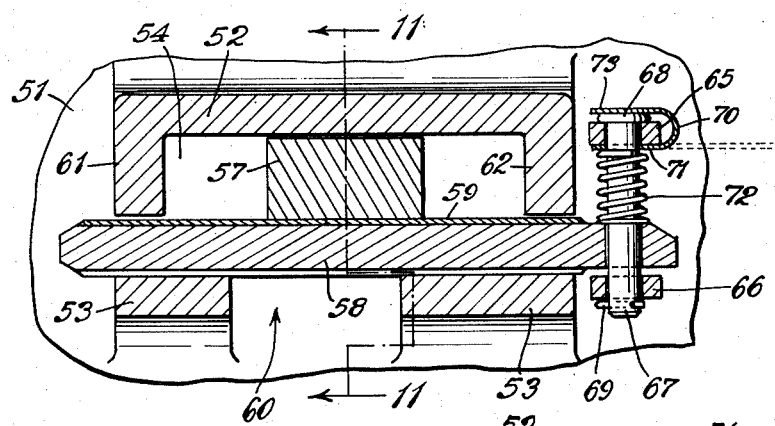
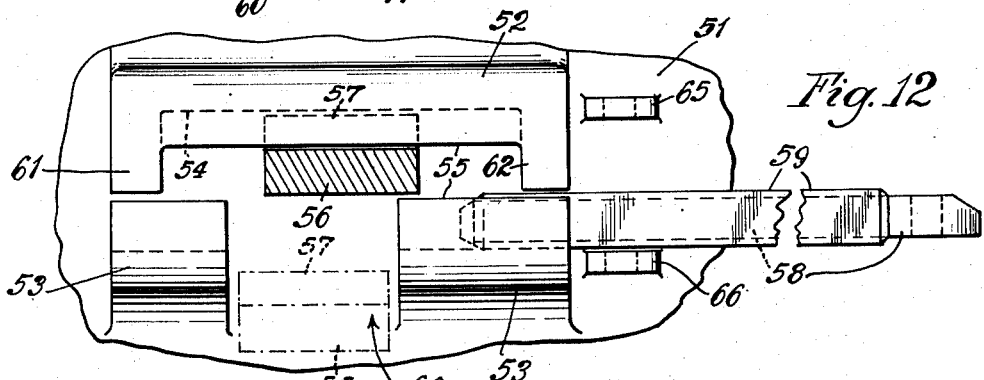
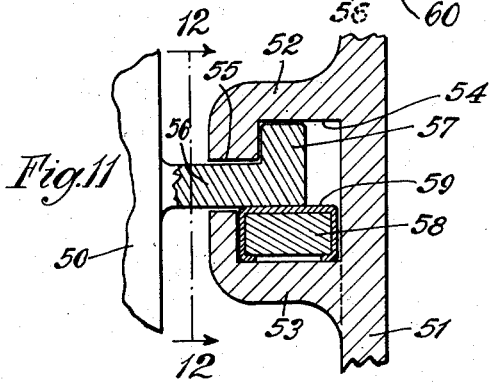
Inventor
William H. Sale
by Parker & Carter
Attorneys Nov. 7, 1950 W. H. SALE 2,529,352
BRAKE BEAM SUSPENSION
Filed April 19, 1946 5 Sheets-Sheet 4
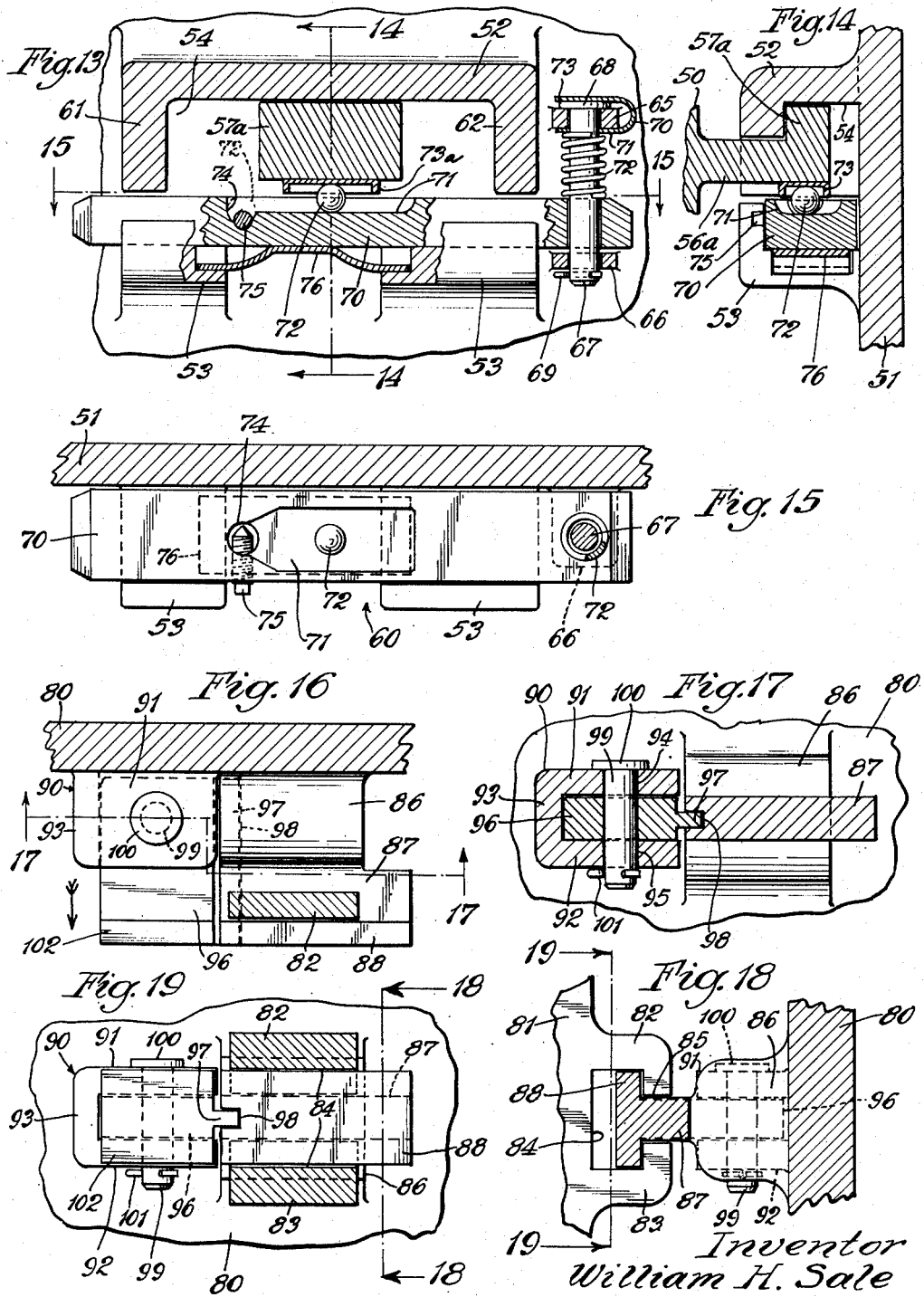
Inventor
William H. Sale
by Parker & Carter
Attorneys.

Nov. 7, 1950   W. H. SALE   2,529,352
BRAKE BEAM SUSPENSION
Filed April 19, 1946   5 Sheets-Sheet 5
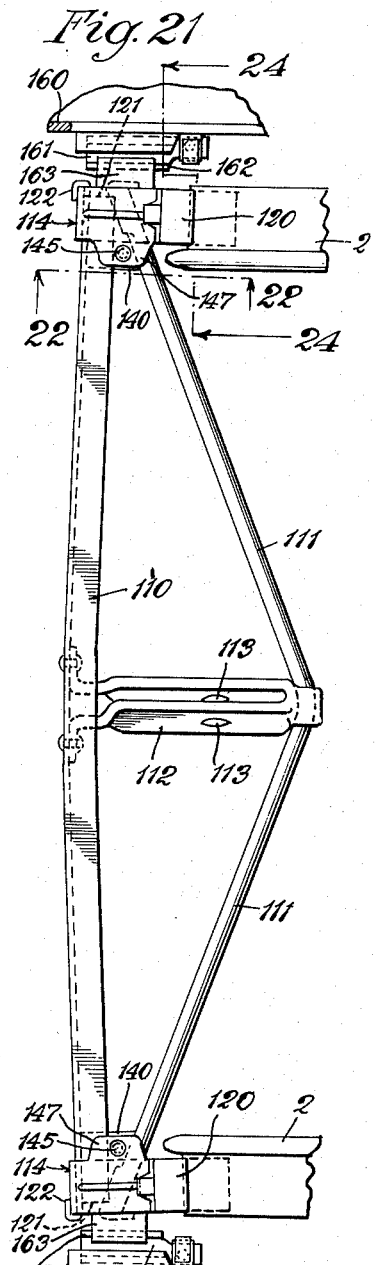
Fig. 21
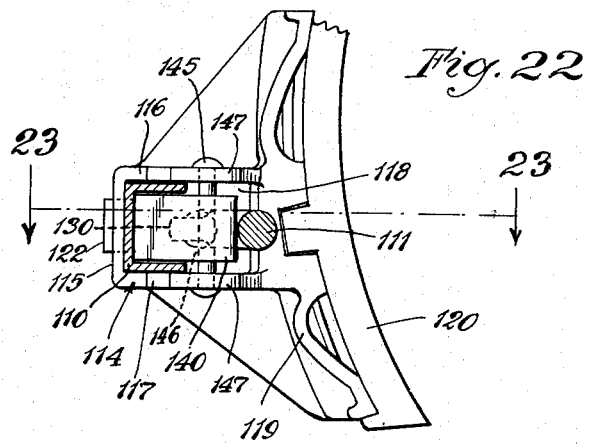
Fig. 22
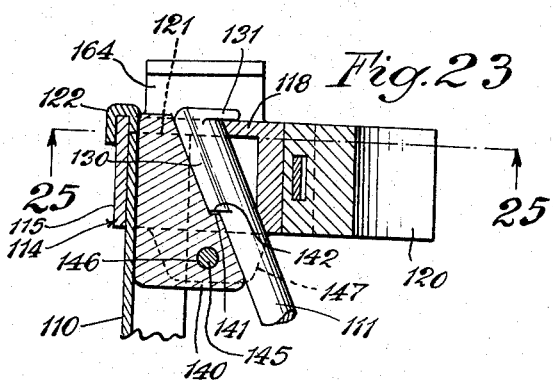
Fig. 23
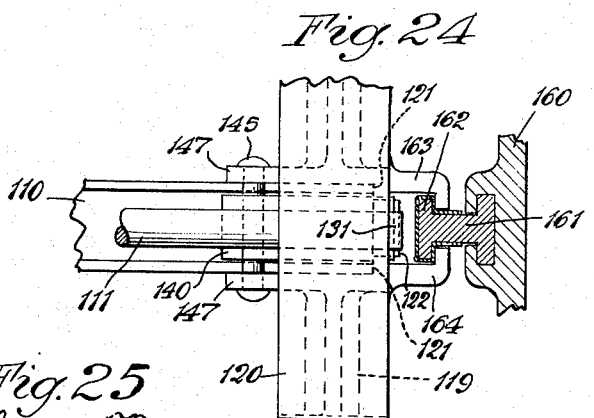
Fig. 24
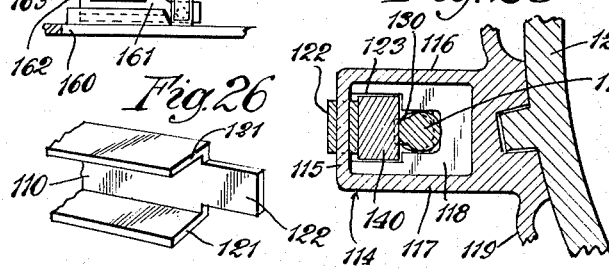
Fig. 25
Fig. 26
Inventor
William H. Sale
by Parker & Carter
Attorneys Patented Nov. 7, 1950

2,529,352

UNITED STATES PATENT OFFICE 2,529,352

BRAKE BEAM SUSPENSION

William H. Sale, Sandston, Va., assignor of one-half to Edmund P. Kelly, Chicago, Ill.

Application April 19, 1946, Serial No. 663,493

15 Claims. (Cl. 188—212)

My invention relates to an improvement in brake beams and brake beam supports. One purpose is to provide improved means for mounting or supporting railroad car brake beams upon the truck frames of the car.

Another purpose is to provide improved means for guiding the movements of brake beams through their braking function.

Another purpose is to provide improved means for permitting ready application of brake beams or removal of brake beams.

Another purpose is to provide an improved brake head structure.

Another purpose is to provide improved wear-taking parts for use with brake beams.

Other purposes will appear from time to time in the course of the specification and claims.

Attention is directed to applicant's co-pending application, Serial Number 32,151, filed June 10, 1948, which contains subject matter relating to this application.

I illustrate the invention more or less diagrammatically in the accompanying drawings wherein;

Figure 1 is a plan view with parts in section illustrating one end of a brake beam and a guiding connection between it and the car truck side frame;

Figure 2 is a section on the line 2—2 of Figure 1, on a slightly reduced scale;

Figure 3 is a section on the line 3—3 of Figure 1 on a larger scale;

Figure 4 is a section on the line 4—4 of Figure 3;

Figure 5 is a view similar to Figure 3 with the parts in a different position;

Figure 6 is a section on the line 6—6 of Figure 3;

Figure 7 is a section on the line 7—7 of Figure 3;

Figure 8 is a perspective view of the key or guide;

Figure 9 is a plan view of a variant form with parts in horizontal section;

Figure 10 is a section on the line 10—10 of Figure 9;

Figure 11 is a section on the line 11—11 of Figure 10;

Figure 12 is a section on the line 12—12 of Figure 11 with the parts in different position;

Figure 13 is a section similar to Figure 10, of a variant form;

Figure 14 is a section on the line 14—14 of Figure 13;

Figure 15 is a section on the line 15—15 of Figure 13;

Figure 16 is a plan view with parts in section illustrating a variant form;

Figure 17 is a section on the line 17—17 of Figure 16;

Figure 18 is a section on the line 18—18 of Figure 19;

Figure 19 is a section on the line 19—19 of Figure 18;

Figure 20 is a view similar to Figure 11, of a variant form;

Figure 21 is a plan view of a variant type of brake beam assembly;

Figure 22 is a section on an enlarged scale on the line 22—22 of Figure 21;

Figure 23 is a section on the line 23—23 of Figure 22;

Figure 24 is a section on the line 24—24 of Figure 21;

Figure 25 is a section on the line 25—25 of Figure 23; and

Figure 26 is a detail.

Referring to the drawings and first to Figure 2, 1 illustrates the track rail and 2 a flanged track wheel with its wheel axle 3. 4 indicates any suitable truck side frame. 5, 6 indicate the components of a truss type brake beam. 7 is any suitable brake head in which may be removably positioned any suitable brake shoe 8. The side frame 4, as will appear for example in Figures 3 and 4, is provided with upper and lower flanges 9 and 10. The flanges are shown as defining between them a T-shaped aperture 11. An adjacent part of the brake head 7 is provided with corresponding and similarly shaped flanges 12 and 13 which define a T-shaped aperture 14. However, the aperture 14 is shown as having the cross part of the T of substantially greater depth or thickness than that of the corresponding cross portion of the aperture 11. In order to guidably connect the brake head and the side frame, I provide a slide generally indicated as 15 which has an end portion 16 apertured as at 17 to receive a locking bolt 18 which may be dropped through apertured flanges 19 and 20 formed on the inner face of the truck side frame. The bolt 18 is upwardly headed as at 21 and is provided with a bottom locking member or cotter pin 22. Thus, when the parts are in the position in which they are shown in Figures 3 and 4, the bolt 18 is held against upward movement. It is further held by a locking plate generally indicated as 23 which has a bottom portion 24 upwardly urged by a coil spring 25. The upper portion of the plate 23 may be bent into the locking position in which it is shown at 26 in Figure 4. In that position it holds the head 21 downwardly against the upper locking lug 19. The slide has an inner portion in the form of a double T with an intermediate bar portion 27, a cross bar portion 28 and an opposite cross bar portion 29. The portion 28 extends into and substantially fills the aperture 11, and is held against movement in relation thereto by the locking pin 18. The opposite cross portion 29 seats in the aperture 14, but is of substantially less thickness, in order to permit relative movement of the brake head 7 toward and away from the truck side frame 4. Preferably the portion 29 is surrounded by a wear-taking plate 30 which extends throughout the area of contact of the member 27 with the flanges or lugs 12 and 13 and the aperture 14 defined therebetween. It will thus be clear that the brake head can slide along the slide structure 27, and it can also move inwardly and outwardly, or toward and away from the side frame 4, because of the clearance provided by the depth of aperture 14. The removable or replaceable cover or wear plate 30 is of suitably hard or wear resistant material, and can be replaced when necessary.

With reference to the form of Figures 9 and following, the brake head is indicated at 50 and the truck side frame at 51. As it will be clear for example in Figure 11 the side frame 51 is provided with an upper lug or flange 52 and a lower lug or flange 53, which together define an aperture 54 having a relatively small entry or slot 55. Mounted on or forming part of the brake head 50 is a lug 56 which extends through the slot 55 and terminates in a head 57. A slide 58 rests upon the bottom flange 53 and holds the brake head lug 56 in the position in which it is shown in Figure 11. It will be understood that the lug 56 may slide along the slot 55 while resting on the wear-taking plate or shell 59 which surrounds the slide 58. The lug 53 is provided with a central open space or separation 60. When the slide 58 is in position this opening 60 is closed. When the slide is removed, space is provided for insertion or removal of the lug 56. As will be clear from Figure 11, the width or depth of the aperture 54 is such as to permit movement of the head 50 toward and away from the side frame 51. Endwise movement of the lug 56 is limited by end lug or flange portions 61, 62. The slide 58, when slid into the position in which it is shown in Figures 9 and 10, may be locked in place by any suitable means. I illustrate for example apertured locking lugs 65, 66, which may be at either end of the slide. However, for convenience, they are shown at the right-hand end of the slide. The locking pin or bolt 67 has an upper head 68 and a lower cotter 69. A locking piece 70 is also employed, the lower part of which, as at 71, is upwardly thrust by the coil spring 72. The upper portion 73 is bent into the locking position in which it is shown in full line in Figure 10. It will be clear that in the form of Figures 9 to 11, as in the earlier form of Figures 1 to 8, a slide is employed which, when in the locking position, limits the brake head to movement in a guided plane. When the slides 27 or 58 are removed, then the head, and the brake beam structure, can be downwardly removed. However, in the form of Figures 9 to 12, the brake head lug 56 actually interpenetrates with the side frame lugs 52 and 53. In both forms, the slide is removed endwise, in order to release the brake head and brake beam assembly for downward removal. It will be understood that in both forms the locking pin or bolt 67 may be positioned at either end of the slide, although for convenience, it is shown at the right-hand edge, referring to the position of the parts as shown in the various drawings.

With reference to the form of Figures 13 to 15 I illustrate a structure generally similar to the form of Figures 9 to 12, and corresponding parts are given corresponding symbols, except where they differ in the two forms. However, I employ a slide 70 having a ball receiving upper channel 71 shown as receiving a ball 72 which bears against downwardly flanged wearing shoe 73a secured to or abutting against the lower face of the brake head lug 56a, 57a. To provide easy endwise removal of the slide 70 I may employ a ball receiving socket 74, normally closed by a set screw 75. I also illustrate a spring 76 abutting against the bottom of the slide 70. When the bolt 67 is released and the slide is drawn laterally to the right, referring to the position of the parts as shown in Figure 13, the spring 76 temporarily supports the end of the slide 70 and permits a slight downward movement. In that position the ball 72 clears the flange of the shoe 73a.

With reference to the form of Figures 16 to 19, 80 indicates the truck side frame and 81 the brake head. The brake head is provided with flanges 82 and 83 which define, with the brake head, an aperture 84 having a communicating slot 85 between the flanges. The side frame 80 has an inwardly extending portion 86 terminating in a T-shaped member having a cross piece 88 located in the aperture 84. The stem of the T, 87, slides into the slot 85. Inwardly extending toward the brake head 81 from the side frame 80 is a U-shaped flange 90 having an upper member 91, a lower member 92 and an end member 93. The members 91 and 92 are provided with aligned apertures 94 and 95. 96 is a slide having a key flange 97 adapted to extend into a key way or slot 98 in one side of the member 87. The slide 96 may be locked into position by any suitable locking bolt or pin 99 having top head 100 and a lower cotter 101. The slide 96 has at its outer end a T portion 102, of the same cross section as the member 88. The brake beam cannot be removed from its guided relationship unless and until the slide 96 is removed in the direction of the arrow of Figure 16. When in the position in which it is shown in Figures 16 and 19 it serves as a continuation of the track or cross member 88 increasing its effective length.

With reference to Figures 21 to 26, I illustrate a somewhat different brake beam assembly having a compression member or channel 110, a tension member 111 and a central cross piece 112 provided with apertures 113 and any suitable operating levers not herein shown. The brake head includes a box-like member 114 having an end wall 115, a top wall 116, a bottom wall 117 and a side wall 118. 119 indicates any suitable brake shoe supporting portion adapted to receive a shoe 120. The compression member or channel 110 extends into the open side of the above formed box. The top and bottom flanges are abutting against the inner faces of the walls 116 and 117 and have their edges 121 abut against the end wall 118. It is also provided with an elongated tongue 122 which projects through an aperture 123 in the wall 118 which can be bent into the position in which it is shown in Figure 23, thus locking the member 110 and the brake head together. The tension member 111 is also provided with flattened end portions 130 and has at each end a tongue 131 which may be bent into the locking position in which it is shown in Figure 23. In assembling the device, wedges 140 are positioned as shown in Figure 23 and are provided with shoulders 141 to abut against corresponding shoulders 142 formed by the flattened portion 130 on the tension member 111. Each wedge is locked by passing through it a locking pin, bolt or rivet 145 which extends through an aperture 146 in the wedge 140 and through aligned apertures in wings or lugs 147 formed in the top and bottom walls 116 and 117.

In order to maintain the assembly in guiding relationship with the truck side frame 160, I may provide any suitable slide 161 which may be the same as shown in Figure 4. Its outer end 162 rides between the lugs 163 and 164 of the above described brake head structure. If it is desired, the brake head structure above described may be welded or permanently secured togther.

With reference to the form of Figure 20, it may be considered in connection with the form of Figure 11, of which there is a variation. Extending from the brake head 150 is a lug 156 with a head portion 157 upwardly extending therefrom. The side frame element 151 has a lower flange 153 with an upward extension 153a. Resting upon and abutting against the upper surface of the flange 153 is a slide 158 carrying a wear-plate 159 upon which the lower face of the member 156 rests. The upper flange 152 defines, with the wear-plate, a space which accommodates the upward projection 157 of the brake head lug 156.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than is limiting me to my precise showing.

The use and operation of my invention are as follows:

I describe and show herein various types of supporting means for brake beams. These types all have in common that I provide, between the truck side frame and the brake head, a generally horizontally extending connection in which a projection on one of the two members extends into a slot on the other member, in such fashion that relative longitudinal and transverse movement is permitted.

In the form of Figures 3 and following I illustrate receiving slots or channels on both the brake head and the truck side frame. A slide is employed which is normally held against movement in relation to the truck side frame, but which permits the brake head to move both longitudinally and transversely in relation to the truck frame. This relationship will be clear for example in Figures 6 and 7. In order to release the brake beam structure for downward movement, all that is necessary is to withdraw the slide longitudinally from between the brake head and the side frame. This can be done by removing the locking pin 18. When the slide 15 has been removed endwise from the two slots or channels, then the entire brake beam structure can be downwardly removed.

In the form of Figures 9 and following, a lug extending from the brake head rests on the removable slide 58. To permit a ready downward removal of the brake beam structure, the slide 58 is removed endwise, and the lug 56 can then be downwardly removed through the gap between the lugs 53.

The form of Figures 13 to 15 is similar to the forms of Figures 9 to 12; but a roller support is provided.

In the form of Figures 16 to 19, a supporting lug integral with the side frame member rides in the slot or channel between the lugs 82 and 83 of the brake head. A slide 96 normally serves as an extension of the supporting lug 87, to which it is secured by a tongue and groove connection as at 97, 98. When the slide 96 is removed, the brake beam structure can be pulled clear, endwise, of the relatively short lug 88, and can be downwardly removed.

Figure 20 resembles Figure 11 but changes the shape of the supporting slide.

Figures 21 to 25, inclusive, illustrate a readily assembled form of brake beam which can be employed with any one of the above described types of connection.

With reference for example to the form of Figures 1 to 8, the T-shaped slide constitutes an interlocking member which provides an interlocking between the side member 4 and the brake head 7. No disconnection is possible without positive action and the help of a workman. Thus a true safety factor is provided, which positively prevents the brake beam from dropping down and causing wrecks or derailment of railroad equipment.

Where I employ the terms "interlock" or "interlocking" it will be understood that I describe the operation of the device as shown, for example, in Figures 4 and 7, in which an interlocking member, such as 15, is slidable along the slot of the opposed element 7 and also accommodates transverse movement of the brake head 7, owing to the excess in transverse width of the space 14 as contrasted to the width of the head or end portion 29.

I claim:

1. In a brake beam supporting connection between a truck side frame and a brake head, flanges on the truck side frame, defining a longitudinally extending and generally horizontal channel having an enlarged inner portion of greater height than the opening of the channel, and a brake head supporting member, in supporting relation with said brake head, including a portion extending into and slidable along said channel, said portion having an enlarged inner end slidably interlocking with the enlarged inner portion of said channel.

2. In a brake beam supporting connection between a truck side frame and a brake head, flanges on the truck side frame, defining a longitudinally extending and generally horizontal channel having an enlarged inner portion of greater height than the opening of the channel, and a brake head supporting member, in supporting relation with said brake head, including a portion extending into and slidable along said channel, including a slide element extending into said channel and adapted normally to support said brake head, while permitting relative movement of brake head and truck side frame, said portion having an enlarged inner end slidably interlocking with the enlarged inner portion of said channel.

3. In a brake beam supporting connection between a truck side frame and a brake head, flanges on the truck side frame, defining a longitudinally extending and generally horizontal channel having an inner portion of greater height than the opening of the channel, and a brake head supporting member, in supporting relation with said brake head, including a portion extending into and slidable along said channel, including a slide element extending into said channel and adapted normally to support said brake head, while permitting relative movement of brake head and truck side frame, and means for normally holding said slide against movement in relation to said truck side frame.

4. In a brake beam supporting connection between a truck side frame and a brake head, flanges on the truck side frame, defining a longitudinally extending and generally horizontal channel having an inner portion of greater height than the opening of the channel, and a brake head supporting member, in supporting relation with said brake head, including a portion extending into and slidable along said channel, including a slide element extending into said channel and adapted normally to support said brake head, while permitting relative movement of brake head and truck side frame, and means for normally holding said slide against movement in relation to said truck side frame, said slide being longitudinally removable from said channel.

5. In a brake beam supporting connection between a truck side frame and a brake head, flanges on the truck side frame, defining a longitudinally extending and generally horizontal channel having an inner portion of greater height than the opening of the channel, and a brake head supporting member, in supporting relation with said brake head, including a portion extending into and slidable along said channel, including a slide element extending into said channel and adapted normally to support said brake head, while permitting relative movement of brake head and truck side frame, and means for normally holding said slide against movement in relation to said truck side frame, including locking lugs vertically aligned with a portion of said slide, and a locking pin, said slide and locking lugs having aligned apertures adapted to receive said pin, and means for holding said pin against unintended removal.

6. In a brake beam supporting connection between a truck side frame and a brake head, flanges on the truck side frame, defining a longitudinally extending and generally horizontal channel having an inner portion of greater height than the opening of the channel, and a brake head supporting member, in supporting relation with said brake head, including a portion extending into and slidable along said channel, including a slide element extending into said channel and adapted normally to support said brake head, while permitting relative movement of brake head and truck side frame, and means for normally holding said slide against movement in relation to said truck side frame, including locking lugs vertically aligned with a portion of said slide, and a locking pin, said slide and locking lugs having aligned apertures adapted to receive said pin, and means for holding said pin against unintended removal, including a locking plate having a portion, below the upper of said locking lugs, apertured to surround said pin, and an upper portion adapted to be bent into opposition to and engagement with the head of said pin.

7. In a brake beam supporting connection between a truck side frame and a brake head, flanges on the truck side frame, defining a longitudinally extending and generally horizontal channel having an inner portion of greater height than the opening of the channel, and a brake head supporting member, in supporting relation with said brake head, including a portion extending into and slidable along said channel, including a slide element extending into said channel and adapted normally to support said brake head, while permitting relative movement of brake head and truck side frame, and means for normally holding said slide against movement in relation to said truck side frame, including locking lugs vertically aligned with a portion of said slide, and a locking pin, said slide and locking lugs having aligned apertures adapted to receive said pin, and means for holding said pin against unintended removal, including a locking plate having a portion, below the upper of said locking lugs, apertured to surround said pin, and an upper portion adapted to be bent into opposition to and engagement with the head of said pin, and yielding means for holding said locking plate against rattling.

8. In a brake beam supporting connection between a truck side frame and a brake head, flanges on the opposed sides of the truck side frame and brake head, defining longitudinally extending and generally horizontal channels, each having an inner portion of greater height than the opening of the channel, and a slide, including portions adapted to extend into each said channel, said slide being thereby adapted to support said brake head in relation to said truck side frame.

9. In a brake beam supporting connection between a truck side frame and a brake head, flanges on the opposed sides of the truck side frame and brake head, defining longitudinally extending and generally horizontal channels, each having an inner portion of greater height than the opening of the channel, and a slide, including portions adapted to extend into each said channel, said slide being thereby adapted to support said brake head in relation to said truck side frame, and means for preventing unintended removal of said slide.

10. In a brake beam supporting connection between a truck side frame and a brake head, flanges on the opposed sides of the truck side frame and brake head, defining longitudinally extending and generally horizontal channels, each having an inner portion of greater height than the opening of the channel, and a slide, including portions adapted to extend into each said channel, said slide being thereby adapted to support said brake head in relation to said truck side frame, and means for preventing unintended removal of said slide, said slide being held against movement in relation to one said channel, while being free to move in the other said channel.

11. In a brake beam supporting connection between a truck side frame and a brake head, flanges on the opposed sides of the truck side frame and brake head, defining longitudinally extending and generally horizontal channels, each having an inner portion of greater height than the opening of the channel, and a slide, including portions adapted to extend into each said channel, said slide being thereby adapted to support said brake head in relation to said truck side frame, and means for preventing unintended removal of said slide, including locking lugs vertically aligned with a portion of said slide, and a locking pin, said slide and locking lugs having aligned apertures adapted to receive said pin, and means for holding said pin against unintended removal.

12. In a brake beam supporting connection between a truck side frame and a brake head, flanges on the opposed sides of the truck side frame and brake head, defining longitudinally extending and generally horizontal channels, each having an inner portion of greater height than the opening of the channel, and a slide, including portions adapted to extend into each said channel, said slide being thereby adapted to support said brake head in relation to said truck side frame, and means for preventing unintended removal of said slide, and means for holding said slide against movement in relation to one said channel, the portion of said slide extending into the other said channel being of a height substantially equal to the height of the channel but of a width less than the width of the channel, whereby both longitudinal and transverse relative movement of slide and channel is permitted.

13. In a brake beam supporting connection between a truck side frame and a brake head, flanges on the opposed sides of the truck side frame and brake head, defining longitudinally extending and generally horizontal channels, each having an inner portion of greater height than the opening of the channel, and a slide, including portions adapted to extend into each said channel, said slide being thereby adapted to support said brake head in relation to said truck side frame, and means for preventing unintended removal of said slide, said slide being held against movement in relation to one said channel, while being free to move in the other said channel, and a wear taking surface member positioned on that portion of the slide which moves in relation to one of the channels.

14. In a brake beam supporting connection between a truck side frame and a brake head, flanges on the brake head, defining a longitudinally extending and generally horizontal channel having an enlarged inner portion of greater height than the opening of the channel, and a supporting member, in supporting relation with said brake head, including a projection from said truck side frame, extending into and slidable along said channel, said portion having an enlarged inner end slidably interlocking with the enlarged inner portion of said channel.

15. In a brake beam supporting connection between a truck side frame and a brake head, flanges on the brake head, defining a longitudinally extending and generally horizontal channel having an inner portion of greater height than the opening of the channel, and a supporting member, in supporting relation with said brake head, including a projection from said truck side frame, extending into and slidable along said channel, and means for maintaining said brake head supporting member in supporting relationship with said brake head, including a slide removably secured to said truck side frame.

WILLIAM H. SALE.

REFERENCES CITED

The following references are of record in the file of this patent:

UNITED STATES PATENTS

| Number | Name | Date |
|---|---|---|
| 956,616 | Williams | May 3, 1910 |
| 1,634,995 | Huntoon | July 5, 1927 |
| 2,170,123 | Busch | Aug. 22, 1939 |
| 2,197,399 | Stillwagon | Apr. 16, 1940 |
| 2,226,551 | Busse | Dec. 31, 1940 |
| 2,254,513 | Busse | Sept. 2, 1941 |
| 2,276,065 | Schaefer | Mar. 10, 1942 |
| 2,282,558 | Busch | May 12, 1942 |

FOREIGN PATENTS

| Number | Country | Date |
|---|---|---|
| 213,943 | Great Britain | Apr. 7, 1924 |